US010450996B2

United States Patent
Nakano

(10) Patent No.: US 10,450,996 B2
(45) Date of Patent: Oct. 22, 2019

(54) FUEL INJECTION CONTROL DEVICE AND FUEL INJECTION CONTROL METHOD FOR INTERNAL COMBUSTION ENGINE

(71) Applicant: TOYOTA JIDOSHA KABUSHIKI KAISHA, Toyota-shi (JP)

(72) Inventor: Tomohiro Nakano, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 5 days.

(21) Appl. No.: 15/888,125

(22) Filed: Feb. 5, 2018

(65) Prior Publication Data

US 2018/0223766 A1 Aug. 9, 2018

(30) Foreign Application Priority Data

Feb. 7, 2017 (JP) .................................. 2017-020715

(51) Int. Cl.
*F02D 41/40* (2006.01)
*F02D 41/24* (2006.01)
(Continued)

(52) U.S. Cl.
CPC .......... *F02D 41/401* (2013.01); *F02D 41/20* (2013.01); *F02D 41/2441* (2013.01); *F02D 41/2467* (2013.01); *F02D 41/345* (2013.01); F02D 41/26 (2013.01); F02D 41/38 (2013.01); F02D 41/402 (2013.01); F02D 2041/2055 (2013.01); F02D 2041/2058 (2013.01);
(Continued)

(58) Field of Classification Search
CPC .... F02D 41/26; F02D 41/402; F02D 41/2055; F02D 41/2441; F02D 41/2467; Y02T 10/44
See application file for complete search history.

(56) References Cited

U.S. PATENT DOCUMENTS 6,386,176 B1 5/2002 McGee
2011/0251808 A1 10/2011 Serra et al.
(Continued)

FOREIGN PATENT DOCUMENTS

JP 2012-524210 10/2012
JP 2013-108422 A 6/2013
(Continued)

*Primary Examiner* — Hieu T Vo
*Assistant Examiner* — Arnold Castro
(74) *Attorney, Agent, or Firm* — Oblon, McClelland, Maier & Neustadt, L.L.P.

(57) ABSTRACT

During rapid warm-up operation, a CPU executes full lift injection processing, in which a nozzle needle reaches a maximum lift amount, in an intake stroke of each cylinder of a four-cylinder internal combustion engine, and then executes partial lift injection processing, in which the nozzle needle does not reach the maximum lift amount, in a compression stroke. On the other hand, during learning of injection characteristics of partial lift injection processing, the CPU executes full lift injection processing after executing partial lift injection processing, both of which are executed within a predetermined period in an intake stroke. The CPU learns the injection characteristics based on an inflection point in the temporal change of the induced electromotive force in a coil following the end of the partial lift injection processing.

9 Claims, 7 Drawing Sheets

(51) Int. Cl.
    *F02D 41/34*     (2006.01)
    *F02D 41/20*     (2006.01)
    F02D 41/38     (2006.01)
    F02D 41/26     (2006.01)
    F02M 51/06     (2006.01)
    F02M 61/10     (2006.01)

(52) U.S. Cl.
    CPC ..... *F02D 2200/063* (2013.01); *F02M 51/061* (2013.01); *F02M 61/10* (2013.01); *Y02T 10/44* (2013.01)

(56) References Cited

U.S. PATENT DOCUMENTS

| | | |
|---|---|---|
| 2012/0101707 A1 | 4/2012 | Kemmer et al. |
| 2014/0311459 A1 | 10/2014 | Katsurahara |
| 2016/0252035 A1* | 9/2016 | Katsurahara ............ F02D 41/20 123/478 |
| 2016/0252037 A1 | 9/2016 | Katsurahara |
| 2016/0348604 A1* | 12/2016 | Higuchi ................ F02D 41/024 |
| 2017/0002765 A1 | 1/2017 | Nakano et al. |
| 2018/0112615 A1* | 4/2018 | Yamanaka .......... F02D 41/2441 |
| 2018/0258877 A1* | 9/2018 | Satake ................... F02D 41/40 |

FOREIGN PATENT DOCUMENTS

| | | |
|---|---|---|
| JP | 2015-75087 A | 4/2015 |
| JP | 2015-190318 | 11/2015 |
| WO | WO 2015/125551 A2 | 8/2015 |

* cited by examiner

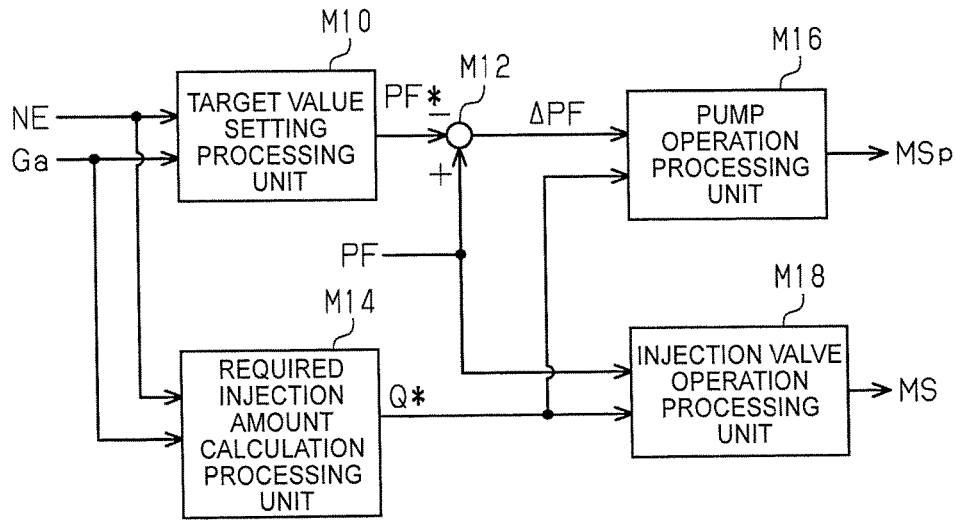

FUEL INJECTION CONTROL DEVICE AND FUEL INJECTION CONTROL METHOD FOR INTERNAL COMBUSTION ENGINE

INCORPORATION BY REFERENCE

The disclosure of Japanese Patent Application No. 2017-020715 filed on Feb. 7, 2017 including the specification, drawings and abstract is incorporated herein by reference in its entirety.

BACKGROUND

1. Technical Field

The disclosure relates to a fuel injection control device and a fuel injection control method for an internal combustion engine in which a plurality of cylinders are respectively provided with fuel injection valves each configured to open when an electromagnetic force generated by energization of a coil acts on a movable element made of a magnetic body.

2. Description of Related Art

Japanese Patent Application Publication No. 2015-190318 (JP 2015-190318 A) describes a fuel injection control device that learns the injection characteristics of a fuel injection valve with respect to partial lift injection that opens the fuel injection valve in such a way that the lift amount of a nozzle needle does not reach a maximum lift amount. This device learns the injection characteristics of the fuel injection valve by detecting the closing timing of the fuel injection valve based on a detection value of an electric potential of a minus-side terminal of a coil which is a terminal opposite to a plus-side terminal of the coil when the fuel injection valve is energized, and corrects an operation signal for the fuel injection valve based on the learned injection characteristics.

SUMMARY

According to the configuration described above, when fuel injection for another cylinder is performed at the time of detecting the electric potential of the minus-side terminal for learning the injection characteristics, electrical noise due to the fuel injection for the other cylinder may be superimposed on the detection value of the electric potential of the minus-side terminal. As a result, there is a possibility that the learning accuracy of the injection characteristics is lowered.

The disclosure provides a fuel injection control device and a fuel injection control method for an internal combustion engine, which can prevent that the learning accuracy of the injection characteristics of partial lift injection is lowered due to fuel injection for another cylinder.

A first aspect of the disclosure is a fuel injection control device for an internal combustion engine having a plurality of cylinders. The internal combustion engine includes fuel injection valves respectively for the plurality of cylinders. The fuel injection valve includes a movable element made of a magnetic body and a nozzle needle. The fuel injection valve is configured to open when an electromagnetic force generated by energization processing to a coil acts on the movable element. The fuel injection control device includes an electronic control unit. The electronic control unit is configured to execute partial lift injection processing that opens the fuel injection valve by the energization processing in such a way that the nozzle needle does not reach a maximum lift amount. The electronic control unit is configured to, when having determined that it is during learning of an injection characteristic of the fuel injection valve, execute valve closing detection processing that detects valve closing of the fuel injection valve based on at least one of a terminal potential of the coil and a current flowing through the coil, the valve closing of the fuel injection valve caused by ending the partial lift injection processing. The electronic control unit is configured to, when executing the valve closing detection processing for one of the plurality of cylinders, set a fuel injection period of the corresponding partial lift injection processing so as not to overlap with a fuel injection period by the fuel injection valve for any of the other cylinders. The electronic control unit is configured to, based on a detection timing of the valve closing of the fuel injection valve by the valve closing detection processing, execute correction processing that corrects the energization processing for execution of the partial lift injection processing.

A second aspect of the disclosure is a fuel injection control method for an internal combustion engine having a plurality of cylinders. The internal combustion engine includes fuel injection valves respectively for the plurality of cylinders and is configured to be controlled by an electronic control unit. The fuel injection valve includes a movable element made of a magnetic body and a nozzle needle. The fuel injection valve is configured to open when an electromagnetic force generated by energization processing to a coil acts on the movable element. The fuel injection control method includes: executing, by the electronic control unit, partial lift injection processing that opens the fuel injection valve by the energization processing in such a way that the nozzle needle does not reach a maximum lift amount; executing, by the electronic control unit, when the electronic control unit has determined that it is during learning of an injection characteristic of the fuel injection valve, valve closing detection processing that detects valve closing of the fuel injection valve based on at least one of a terminal potential of the coil and a current flowing through the coil, the valve closing of the fuel injection valve caused by ending the partial lift injection processing; setting, by the electronic control unit, when executing the valve closing detection processing for one of the plurality of cylinders, a fuel injection period of the corresponding partial lift injection processing so as not to overlap with a fuel injection period by the fuel injection valve for any of the other cylinders; and executing, by the electronic control unit, based on a detection timing of the valve closing of the fuel injection valve by the valve closing detection processing, correction processing that corrects the energization processing for execution of the partial lift injection processing.

In the above-described configuration, the electronic control unit detects, by the valve closing detection processing, the valve closing of the fuel injection valve based on at least one of the terminal potential of the coil and the current flowing through the coil. If the energization processing to the coil is executed for the other cylinder when the valve closing detection processing is executed, there is a possibility that noise caused by this is superimposed on a detection result of the terminal potential of the coil being the detection object or the current flowing through the coil being the detection object. Therefore, in the above-described configuration, when executing the valve closing detection processing, the fuel injection period of the partial lift injection processing is set so as not to overlap with the fuel injection period for the other cylinder. Consequently, it is possible to prevent the valve closing detection processing from receiving the influence of noise which is caused by execution of the energization processing to the coil for the other cylinder, and therefore, it is possible to prevent that the learning accuracy of the injection characteristic of the partial lift injection is lowered due to the fuel injection for the other cylinder.

In the fuel injection control device, the electronic control unit may be configured to execute injection amount division processing that divides a required injection amount for the fuel injection valve into an injection amount for the partial lift injection processing and an injection amount for full lift injection processing that opens the fuel injection valve to the maximum lift amount. The electronic control unit may be configured to, when having determined that a learning condition for the injection characteristic of the fuel injection valve is established, execute time division processing that operates the fuel injection valve so as to execute the full lift injection processing after executing the partial lift injection processing based on the injection amount division processing. The electronic control unit may be configured to, when executing the valve closing detection processing, set a fuel injection period of the partial lift injection processing and a fuel injection period of the full lift injection processing so as not to overlap with each other in the plurality of cylinders.

In the above-described configuration, when learning the injection characteristic of the fuel injection valve, the full lift injection is executed after the partial lift injection, so that it is possible to fully prevent the valve closing detection processing from receiving the influence of residual magnetic flux of the coil due to the full lift injection using the coil being the detection object. Further, since the fuel injection period of the partial lift injection processing and the fuel injection period of the full lift injection processing are set so as not to overlap with each other in the cylinders, it is possible to prevent the valve closing detection processing from receiving the influence of noise which is caused by execution of the energization processing to the coil by the full lift injection processing for the other cylinder.

The fuel injection valve may be configured to inject fuel into a combustion chamber. The electronic control unit may be configured to, when executing the valve closing detection processing, set the fuel injection period of the partial lift injection processing and the fuel injection period of the full lift injection processing within a predetermined period in an intake stroke.

In the above-described configuration, since the fuel injection period of the partial lift injection processing and the fuel injection period of the full lift injection processing are set within the predetermined period in the intake stroke, the air-fuel mixture to be combusted in the combustion chamber can be easily put in a fully mixed state of fuel and air compared to setting them in the compression stroke.

In the fuel injection control device, the electronic control unit may be configured to execute advance processing that sets an injection start timing of the partial lift injection processing, according to establishment of the learning condition, on a more advanced side when a rotational speed of a crankshaft of the internal combustion engine is high than when the rotational speed is low.

Since the speed at which the piston moves away from the fuel injection valve becomes higher when the rotational speed of the crankshaft is high than when it is low, even if the injection start timing is set on the more advanced side, it is possible to suppress the occurrence of a situation in which injected fuel adheres to the piston. On the other hand, when fuel is injected after the piston is moved sufficiently away from the fuel injection valve, the possibility is increased that the injected fuel adheres to a wall surface of the cylinder. Therefore, in the above-described configuration, by setting the injection start timing on the more advanced side when the rotational speed is high than when it is low, adhesion of the injected fuel to the piston or the wall surface of the cylinder can be suppressed to the utmost.

The fuel injection valve may be configured to inject fuel into a combustion chamber, and the electronic control unit may be configured to, when having determined that the learning condition for the injection characteristic of the fuel injection valve is not established, execute the partial lift injection processing after executing the full lift injection processing.

In the above-described configuration, since the partial lift injection processing is executed after executing the full lift injection processing, compared to a case where the order is reversed, the execution period of the partial lift injection processing can be set close to the ignition timing, so that it is easy to cause fuel injected by the partial lift injection processing to suitably float around an ignition plug at the ignition timing.

In the fuel injection control device, the electronic control unit may be configured to, when having determined that the learning condition for the injection characteristic of the fuel injection valve is not established, execute the partial lift injection processing in a compression stroke.

In the above-described configuration, since the partial lift injection processing is executed in the compression stroke, compared to executing the partial lift injection processing in the intake stroke, the execution period of the partial lift injection processing can be set close to the ignition timing, so that it is easy to cause fuel injected by the partial lift injection processing to suitably float around an ignition plug at the ignition timing.

The internal combustion engine may further include a fuel tank storing fuel to be injected by the fuel injection valve and a fuel pump configured to discharge the fuel in the fuel tank to the fuel injection valve side. The electronic control unit may be configured to execute variable setting processing that variably sets a target value of a pressure of the fuel to be supplied to the fuel injection valve. The electronic control unit may be configured to control the fuel pump so as to execute fuel pressure control processing that controls the pressure of the fuel to be supplied to the fuel injection valve to the target value set by the variable setting processing. The electronic control unit may be configured to execute injection amount variable processing that increases an injection amount of the partial lift injection processing, according to establishment of the learning condition, when the pressure of the fuel to be supplied to the fuel injection valve is high compared to when the pressure is low.

Even when the continuation time of the energization processing is the same, the injection amount increases when the pressure of the fuel is high compared to when it is low. Therefore, in order to provide the same injection amount of the partial lift injection processing according to the learning request, the continuation time of the energization processing becomes short when the pressure is high compared to when it is low. It has been found by the inventors that when the continuation time of the energization processing is excessively short, the detection accuracy by the valve closing detection processing is lowered. On the other hand, when the continuation time of the energization processing is excessively long, there is a possibility that the lift amount unintentionally reaches the maximum value. Therefore, in the above-described configuration, by increasing the injection amount of the partial lift injection processing, according to the learning request, when the pressure of the fuel is high compared to when it is low, the energization processing that is appropriate for learning can be executed regardless of the magnitude of the pressure.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is a block diagram showing processing for operating a high-pressure fuel pump and a fuel injection valve according to the embodiment;

FIG. 3A is a time chart showing injection timings of partial lift injection according to the embodiment;

FIG. 3B is a time chart showing injection timings of partial lift injection according to the embodiment;

DETAILED DESCRIPTION OF EMBODIMENTS

Figure 1:
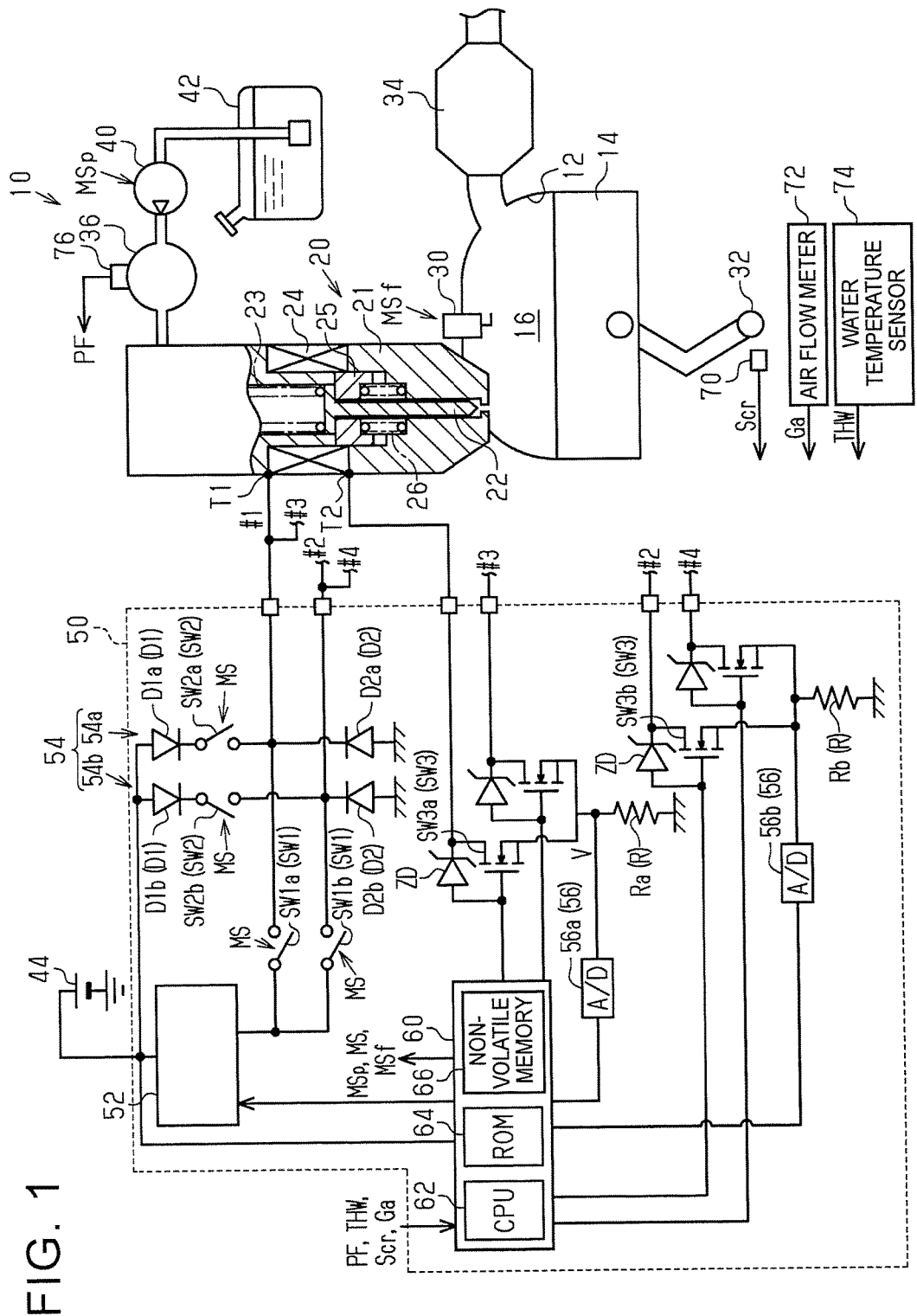
FIG. 1 is a diagram showing a fuel injection control device and an internal combustion engine according to an embodiment.

Hereinbelow, a fuel injection control device for an internal combustion engine according to an embodiment will be described with reference to the drawings. As shown in FIG. 1, a fuel injection valve 20 protrudes into a combustion chamber 16 defined by a cylinder 12 and a piston 14 of an internal combustion engine 10. In this embodiment, the internal combustion engine 10 is a four-cylinder internal combustion engine. In FIG. 1, only a first combustion cylinder #1 is shown, while an illustration of second, third, and fourth combustion cylinders #2, #3, and #4 is omitted. It is to be noted that the i-th combustion cylinder #i (i=1 to 4) represents the combustion cylinder in which the compression top dead center occurs at the i-th timing in a combustion cycle.

A nozzle needle 22 is housed in a hollow body 21 of the fuel injection valve 20. The nozzle needle 22 is biased in a valve closing direction by an elastic force of a spring 23. The fuel injection valve 20 includes a coil 24 and a movable element 25 made of a magnetic body. The nozzle needle 22 has a shape such that the area of a cross section perpendicular to a displacement direction is increased on the spring 23 side, and this area-increased portion faces the movable element 25 on the side opposite to the spring 23. The movable element 25 is biased in a valve opening direction by an elastic force of a spring 26. The elastic force of the spring 23 is set to be greater than the elastic force of the spring 26 so that the fuel injection valve 20 is maintained in a closed state when an electromagnetic force by the coil 24 does not act on the movable element 25, while the fuel injection valve 20 is opened when an electromagnetic force by the coil 24 acts on the movable element 25.

An ignition device 30 protrudes into the combustion chamber 16. A mixture of air and fuel injected from the fuel injection valve 20 is combusted by spark discharge of the ignition device 30. Combustion energy of the air-fuel mixture is converted into rotational energy of a crankshaft 32 via the piston 14. The air-fuel mixture combusted in the combustion chamber 16 flows out as exhaust gas into a catalyst 34 so as to be purified.

Fuel is supplied to the fuel injection valve 20 from a high-pressure delivery pipe 36. Fuel in a fuel tank 42 is pressurized by a high-pressure fuel pump 40 and supplied to the high-pressure delivery pipe 36.

An electronic control unit 50 controls the internal combustion engine 10. In order to control the control amounts (torque, exhaust gas components, etc.) of the internal combustion engine 10, the electronic control unit 50 is configured to operate various actuators such as the fuel injection valves 20, the ignition devices 30, and the high-pressure fuel pump 40.

The electronic control unit 50 includes a drive circuit for the fuel injection valves 20. That is, a booster circuit 52 boosts and outputs terminal voltage of a battery 44. In this embodiment, taking into account that fuel injection periods may overlap with each other in the cylinders in which the combustion strokes are adjacent to each other in time sequence, current paths that are independent of each other are respectively provided for the coils 24 of the first and third combustion cylinders #1 and #3 and the coils 24 of the second and fourth combustion cylinders #2 and #4. That is, a switching element SW1a opens and closes between first terminals T1 of the coils 24 of the first and third combustion cylinders #1 and #3 and the booster circuit 52, while a switching element SW1b opens and closes between first terminals T1 of the coils 24 of the second and fourth combustion cylinders #2 and #4 and the booster circuit 52. In this way, in FIG. 1, "a" is assigned to the end of each of numbers of members forming the current path for the coils 24 of the first and third combustion cylinders #1 and #3, while "b" is assigned to the end of each of numbers of members forming the current path for the coils 24 of the second and fourth combustion cylinders #2 and #4. Hereinbelow, when a description common to the current path for the coils 24 of the first and third combustion cylinders #1 and #3 and the current path for the coils 24 of the second and fourth combustion cylinders #2 and #4 is given, the numbers of the members with "a" or "b" removed at their ends will be used.

The first terminals T1 of the coils 24 are connected with a constant current circuit configured to directly apply the terminal voltage of the battery 44 so as to control a current, that flows through each coil 24, at a constant value. The constant current circuit includes diodes D1 each having an anode connected to the battery 44, switching elements SW2 each for opening and closing between a cathode of the diode D1 and the first terminals T1 of the coils 24, and diodes D2 each having a cathode connected to the first terminals T1 of the coils 24 and an anode grounded. Second terminals T2 of the coils 24 are each grounded via a switching element SW3 provided for each cylinder and via a shunt resistor R that is shared by the pair of cylinders. In this embodiment, an n-channel MOS field-effect transistor is used as the switching element SW3 by way of example. A cathode of a Zener diode ZD is connected to a drain of the switching element SW3, while an anode of the Zener diode ZD is connected to a gate of the switching element SW3.

A voltage drop across the shunt resistor Ra is converted into digital data by an A/D converter 56a, while a voltage drop across the shunt resistor Rb is converted into digital data by an A/D converter 56b.

The electronic control unit 50 further includes a microcomputer 60. The microcomputer 60 includes a CPU 62, a ROM 64, and an electrically rewritable nonvolatile memory 66. The control of the control amounts by the electronic control unit 50 described above is realized by the CPU 62 executing programs stored in the ROM 64. In the control of the control amounts, the CPU 62 acquires output signals of a crank angle sensor 70 that detects a rotation angle of the crankshaft 32, an air flow meter 72 that detects an intake air amount Ga, a water temperature sensor 74 that detects a temperature of cooling water (water temperature THW) of the internal combustion engine 10, and a pressure sensor 76 that detects a pressure PF in the high-pressure delivery pipe 36.

FIG. 2 shows part of the processing that is realized by the CPU 62 executing the programs stored in the ROM 64. Based on a rotational speed NE calculated from the output signal Scr of the crank angle sensor 70 and the intake air amount Ga, a target value setting processing unit M10 sets a target value PF* of the pressure in the high-pressure delivery pipe 36 to be higher when the filling air amount in the combustion chamber 16 is large than when it is small. A deviation calculation processing unit M12 calculates a difference (deviation ΔPF) between the target value PF* and the pressure PF.

Based on the rotational speed NE and the intake air amount Ga, a required injection amount calculation processing unit M14 calculates a required injection amount Q*. The required injection amount Q* is set to an amount that causes the air-fuel ratio of a mixture for combustion in the combustion chamber 16 to be a target air-fuel ratio. The target air-fuel ratio may be set to, for example, a stoichiometric air-fuel ratio.

Based on the deviation ΔPF and the required injection amount Q*, a pump operation processing unit M16 produces an operation signal MSp of the high-pressure fuel pump 40 and outputs it. Herein, the required injection amount Q* is for calculating an operation amount of open-loop control (open-loop operation amount) that causes fuel in an amount equal to the required injection amount Q* to be pumped from the high-pressure fuel pump 40 to the high-pressure delivery pipe 36, while the deviation ΔPF is for calculating an operation amount (feedback operation amount) that causes the pressure PF to be feedback-controlled to the target value PF*. That is, the operation signal MSp is produced based on both the open-loop operation amount and the feedback operation amount.

Based on the required injection amount Q*, an injection valve operation processing unit M18 produces an operation signal MS for operating the fuel injection valve 20 and outputs it. In principle, the injection valve operation processing unit M18 performs so-called full lift injection such that the nozzle needle 22 reaches a position (position shown in FIG. 1) where the lift amount of the nozzle needle 22 becomes a maximum lift amount. In this embodiment, during rapid warm-up operation for the catalyst 34, the injection valve operation processing unit M18 performs, in addition to the full lift injection, partial lift injection such that the lift amount of the nozzle needle 22 does not reach the maximum lift amount.

FIG. 3A shows fuel injection during rapid warm-up operation. As shown in FIG. 3A, during rapid warm-up operation, partial lift injection (indicated by "P/L" in FIG. 3A) is performed in the compression stroke after full lift injection (indicated by "F/L" in FIG. 3A) is performed in the intake stroke. Herein, the reason for performing the full lift injection in the intake stroke is to increase the mixing degree of air and fuel in a mixture. On the other hand, the reason for performing the partial lift injection in the compression stroke is to cause fuel injected by the partial lift injection to float around a plug of the ignition device 30 at the ignition timing. In this embodiment, the ignition timing is set after the compression top dead center, thereby increasing the calorific value of exhaust gas generated by combustion so as to promote warm-up of the catalyst 34.

In this embodiment, other than during rapid warm-up operation, partial lift injection is performed for learning the injection characteristics of the fuel injection valves 20 with respect to partial lift injection. FIG. 3B shows fuel injection during learning. As shown in FIG. 3B, during a predetermined period in the intake stroke, partial lift injection processing is first performed and then full lift injection processing is performed. Hereinbelow, learning processing will be described.

Figure 4:
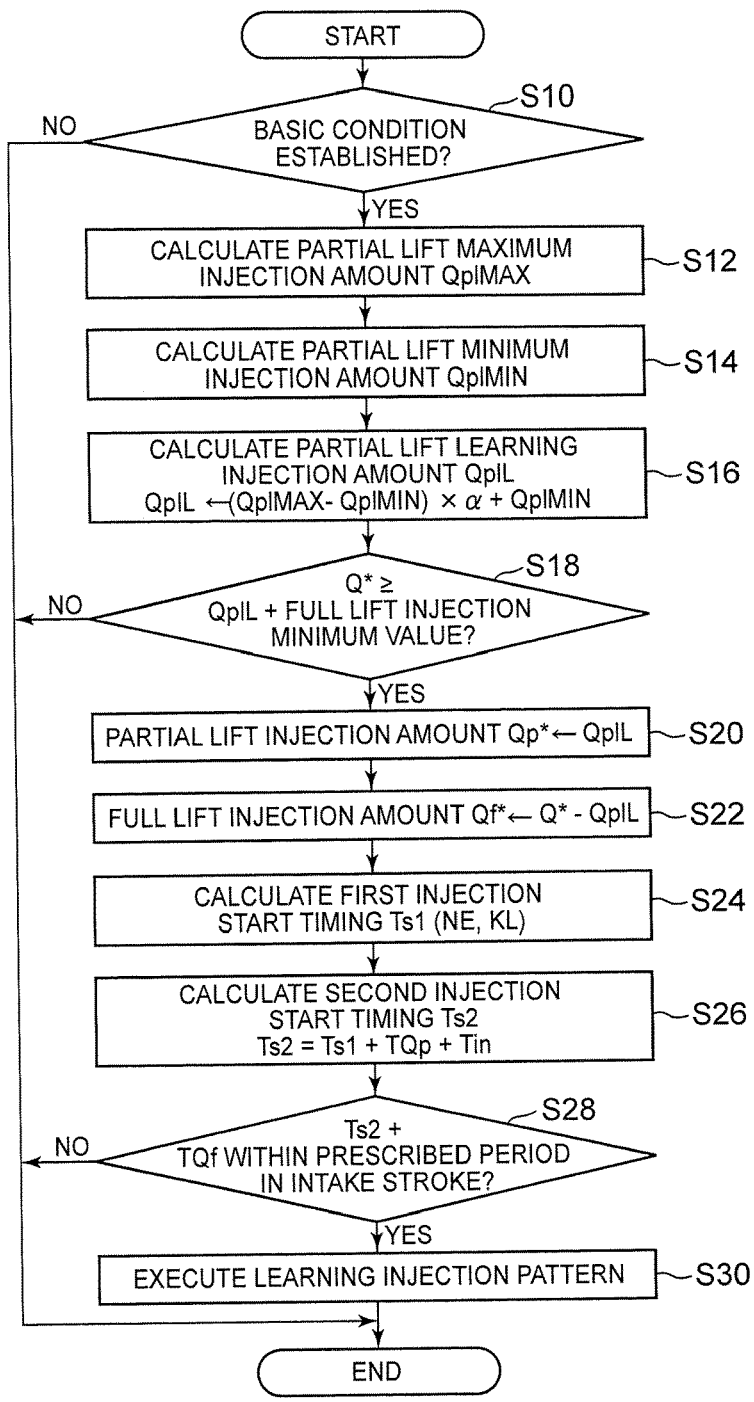
FIG. 4 is a flowchart showing the sequence of fuel injection processing during learning according to the embodiment.

FIG. 4 shows the sequence of fuel injection processing during learning. The processing shown in FIG. 4 is realized by the CPU 62 repeatedly executing the program stored in the ROM 64 at a predetermined cycle. Hereinbelow, step numbers will be given by numerals each added with "S" as a prefix.

In a series of processing shown in FIG. 4, the CPU 62 first determines whether or not the basic condition for learning is established (S10). The basic condition for learning includes a condition that a request for using partial lift injection for the primary purpose is not made. In other words, the basic condition for learning includes a condition that an execution request for the rapid warm-up operation is not made.

When the CPU 62 has determined that the basic condition for learning is established (S10: YES), the CPU 62 calculates, based on a pressure PF, a partial lift maximum injection amount Qp1MAX which is a maximum injection amount by partial lift injection (S12). The partial lift maximum injection amount Qp1MAX is a maximum value of fuel injection amounts in a region determined by the pressure PF within a region (indicated by "P/L REGION" in FIG. 5) where partial lift injection is enabled. Herein, a minimum value in the region where partial lift injection is enabled is set to a value greater than zero. This setting is made taking into account that when the injection amount is excessively small, variation in injection amounts becomes large even with the same energization time of the coil 24 so that the injection amount control accuracy deviates from an allowable range.

Figure 5:
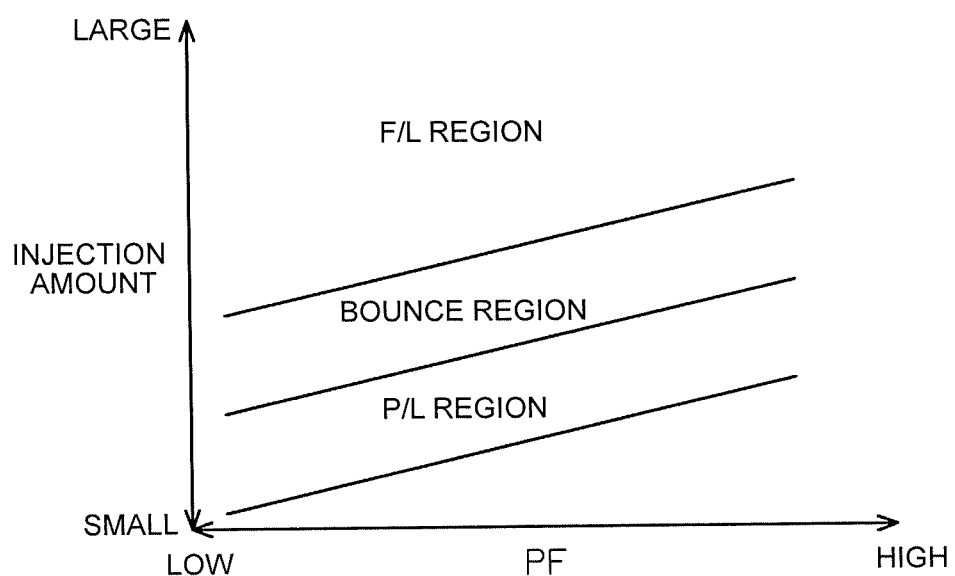
FIG. 5 is a diagram showing the relationship between the fuel pressure and the injection amount according to the embodiment.

As shown in FIG. 5, the region where partial lift injection is enabled is a region where the higher the pressure PF, the greater the injection amount. This is caused by the fact that even when the lift amount of the nozzle needle 22 is the same, the injection amount increases as the pressure PF increases.

Referring back to FIG. 4, after calculating the partial lift maximum injection amount Qp1MAX, the CPU 62 calculates, based on the pressure PF, a partial lift minimum injection amount Qp1MIN which is a minimum injection amount by partial lift injection (S14). The partial lift minimum injection amount Qp1MIN is a minimum value of fuel injection amounts in the region determined by the pressure PF within the region where partial lift injection is enabled, shown in FIG. 5. In this embodiment, in order to perform the processing of S12 and S14, data expressing the information shown in FIG. 5 is stored in advance in the ROM 64.

Then, the CPU 62 calculates a partial lift learning injection amount Qp1L which is an injection amount of partial lift injection for learning, using the following formula (c1) (S16).

$$Qp1L=(Qp1MAX-Qp1MIN) \times \alpha + Qp1MIN \quad (c1)$$

In the formula (c1), a coefficient $\alpha$ is a value greater than zero and smaller than "1". In this embodiment, the coefficient $\alpha$ is set to a value about "½". This is because when the partial lift learning injection amount Qp1L is excessively small, the learning accuracy tends to decrease. On the other hand, when the partial lift learning injection amount Qp1L is excessively large, there is a concern that the nozzle needle 22 actually reaches its maximum lift amount in partial lift injection processing for learning due to tolerance, temporal change, etc. of the fuel injection valve 20. Therefore, in this embodiment, the partial lift learning injection amount Qp1L is set to an amount which is between the partial lift maximum injection amount Qp1MAX and the partial lift minimum injection amount Qp1MIN and which is away from both the partial lift maximum injection amount Qp1MAX and the partial lift minimum injection amount Qp1MIN by a predetermined amount or more.

Then, the CPU 62 determines whether or not a required injection amount Q* is equal to or greater than the sum of the partial lift learning injection amount Qp1L and a full lift injection minimum value which is a minimum injection amount by full lift injection (S18). This processing is for determining whether or not one of execution conditions for learning is established. The CPU 62 calculates the full lift injection minimum value based on the pressure PF. As shown in FIG. 5, a region (indicated by "F/L REGION" in FIG. 5) where full lift injection is enabled is a region where the injection amount is greater than the injection amount in a bounce region. The bounce region is an injection amount region that ends within a prescribed time from a timing at which the nozzle needle 22 is displaced in the valve opening direction to reach its maximum lift amount by energization processing to the coil 24. When the nozzle needle 22 reaches its maximum lift amount, there occurs a phenomenon that the nozzle needle 22 comes in contact with the body 21 and rebounds. Therefore, when the energization processing is finished at a timing after and near the timing at which the nozzle needle 22 reaches its maximum lift amount, variation in injection amounts becomes large even with the same energization time, so that there is a possibility that the injection amount control accuracy deviates from an allowable range. Accordingly, in this embodiment, the injection amount region that ends within the prescribed time from the timing at which the nozzle needle 22 is displaced in the valve opening direction to reach its maximum lift amount is set as the bounce region, and fuel injection is performed by avoiding the bounce region.

Referring back to FIG. 4, when the CPU 62 has determined that the required injection amount Q* is equal to or greater than the sum described above (S18: YES), the CPU 62, determining that one of the execution conditions for learning is established, substitutes the partial lift learning injection amount Qp1L for a partial lift injection amount Qp* (S20). Then, the CPU 62 substitutes a value, obtained by subtracting the partial lift learning injection amount Qp1L from the required injection amount Q*, for a full lift injection amount Qf* (S22). Then, the CPU 62 calculates an injection start timing Ts1 of partial lift injection as first injection based on a rotational speed NE and a load KL (S24). Herein, the load KL is calculated as an amount corresponding to a filling air amount in the combustion chamber 16 based on an intake air amount Ga and a rotational speed NE. The CPU 62 sets the injection start timing Ts1 on the more advanced side when the rotational speed NE is high than when it is low.

Then, the CPU 62 calculates an injection start timing Ts2 of full lift injection as second injection based on the following formula (c2) (S26).

$$Ts2=Ts1+TQp+Tin \quad (c2)$$

In the formula (c2), an energization time TQp of the coil 24 by partial lift injection and an interval Tin are used. The CPU 62 calculates the energization time TQp based on the partial lift injection amount Qp* and the pressure PF. On the other hand, the interval Tin is a fixed value that does not depend on the rotational speed NE. The interval Tin is set to a time such that the influence of magnetic flux generated in the coil 24 by partial lift injection processing on full lift injection can be ignored.

Then, the CPU 62 determines whether or not "Ts2+TQf" which is an injection end timing of full lift injection falls within a prescribed period in the intake stroke (S28). This processing is for determining whether or not one of the execution conditions for learning is established. A start point of the prescribed period is the injection start timing Ts1 set by the processing of S24, while an end point of the prescribed period is variably set based on the rotational speed NE and the load KL in the intake stroke. The CPU 62 calculates the injection end timing of full lift injection based on an energization time TQf of the coil 24 by full lift injection. The CPU 62 calculates the energization time TQf based on the full lift injection amount Qf* and the pressure PF.

When the CPU 62 has determined that the injection end timing of full lift injection falls within the prescribed period (S28: YES), the CPU 62 executes a learning injection pattern shown in FIG. 3B (S30). When the processing of S30 has been completed or when a negative determination has been made at S10, S18, or S28, the CPU 62 once ends the series of processing shown in FIG. 4.

Figure 6:
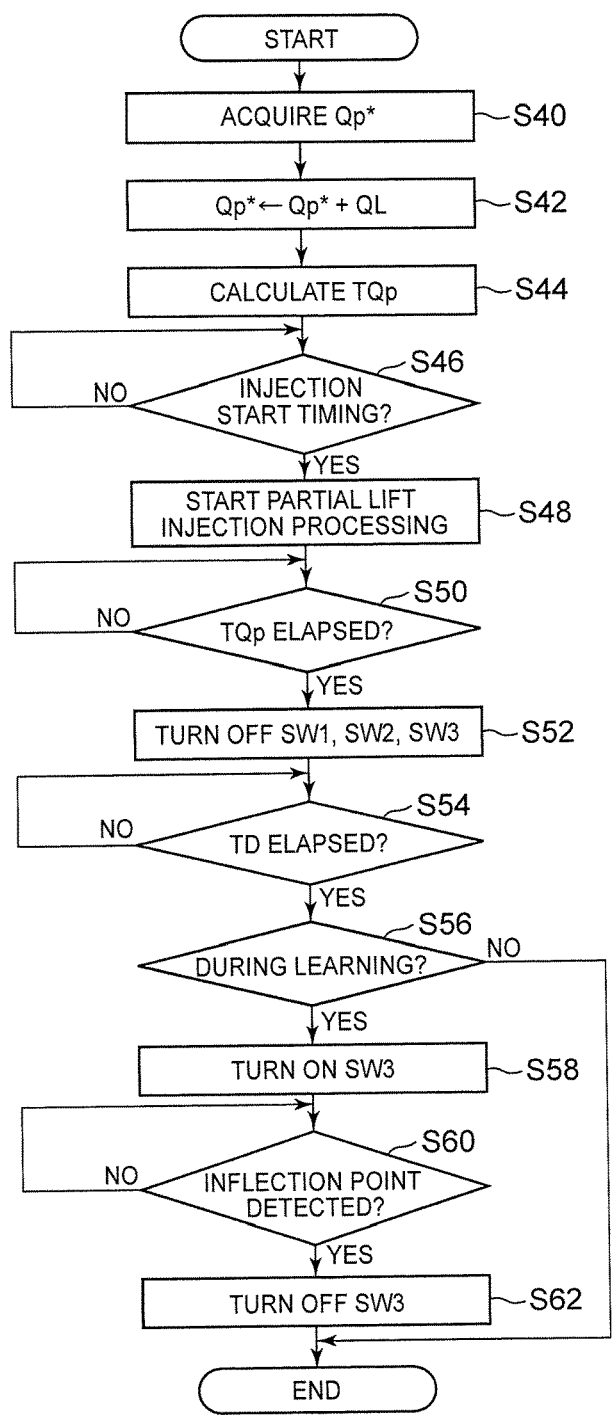
FIG. 6 is a flowchart showing the sequence of partial lift injection processing according to the embodiment.

FIG. 6 shows the sequence of partial lift injection processing and subsequent learning processing. The processing shown in FIG. 6 is realized by the CPU 62 executing the program stored in the ROM 64 at every occurrence of an execution request for partial lift injection. This processing is common to that during rapid warm-up operation.

In a series of processing shown in FIG. 6, the CPU 62 first acquires a partial lift injection amount Qp* (S40). Then, the CPU 62 corrects the partial lift injection amount Qp* by adding to the partial lift injection amount Qp* a correction amount QL that is calculated based on data about a later-described learning result stored in the nonvolatile memory 66 (S42). Then, the CPU 62 calculates an energization time TQp by partial lift injection processing (S44). Then, the CPU 62 stands by until the injection start timing is reached (S46: NO). Then, when the CPU 62 has determined that the injection start timing has been reached (S46: YES), the CPU 62 starts partial lift injection processing (S48).

Figure 7:
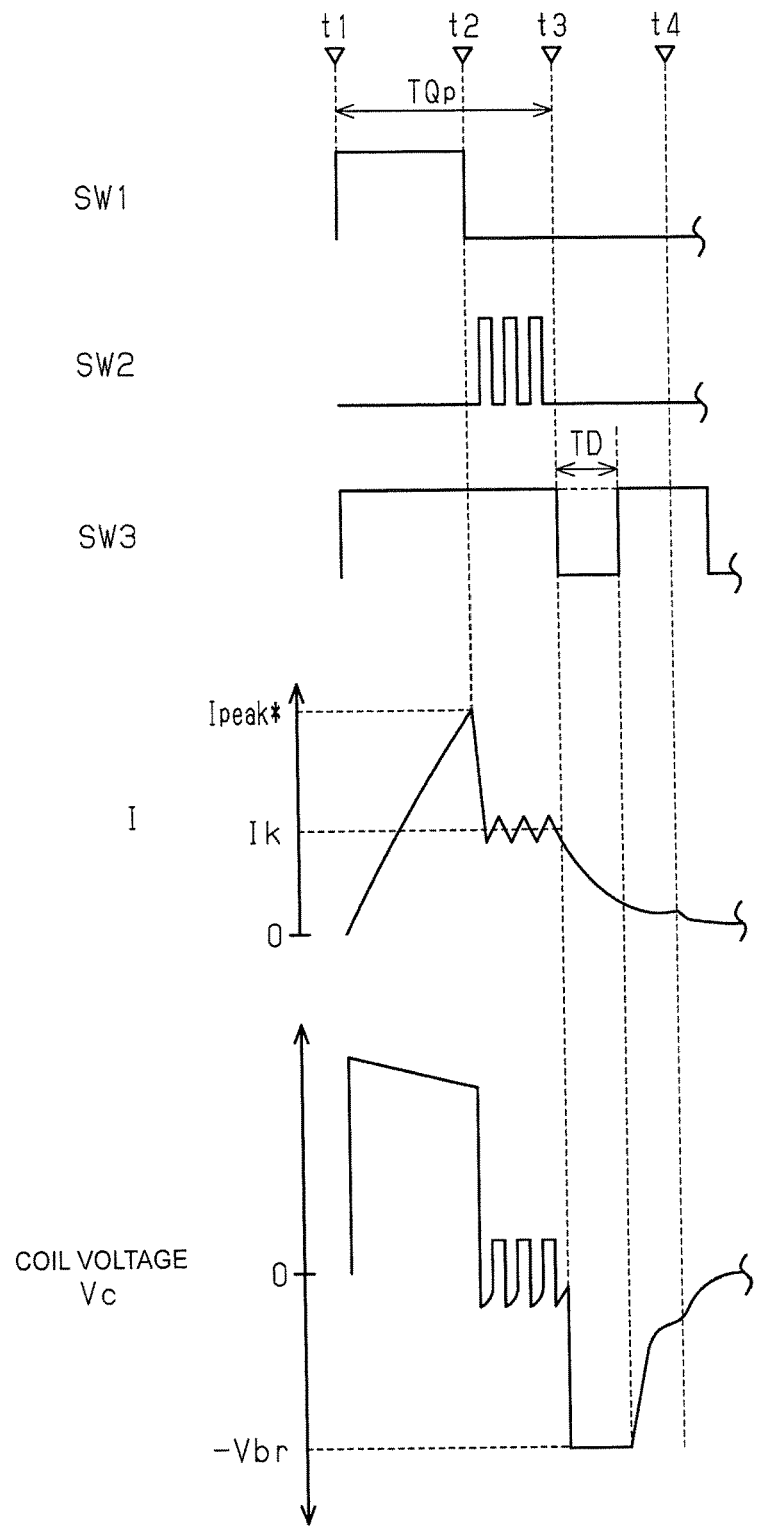
FIG. 7 is a time chart showing partial lift injection according to the embodiment.

FIG. 7 shows operations of the switching elements SW1 to SW3 by partial lift injection processing, along with a current I flowing through the coil 24 and a voltage Vc of the coil 24. In FIG. 7, the voltage Vc of the coil 24 is shown as positive when the electric potential of the first terminal T1 is higher than that of the second terminal T2.

As shown in FIG. 7, the CPU 62 turns on the switching elements SW1 and SW3 at time t1 at which partial lift injection is started. Consequently, the current I flows through a loop circuit including the booster circuit 52, the switching element SW1, the coil 24, the switching element SW3, and the shunt resistor R. The CPU 62 seizes the magnitude of the current I based on the electric potential V and turns off the switching element SW1 at time t2 at which the current I reaches a peak command value Ipeak*. Consequently, the current I flows through the coil 24 via a loop path formed by the diode D2, the coil 24, the switching element SW3, and the shunt resistor R and gradually decreases. Then, the CPU 62 turns on the switching element SW2 when the current I becomes less than a holding current Ik, thereby controlling the current I at the holding current Ik.

Referring back to FIG. 6, the CPU 62 continues the control of the current I at the holding current Ik until the energization time TQp elapses (S50: NO), and when the energization time TQp has elapsed (S50: YES), the CPU 62 turns off the switching elements SW1 to SW3 (S52).

Consequently, since an induced electromotive force that causes the current I to continue to flow is generated in the coil 24, the electric potential on the second terminal T2 side increases to be a breakdown voltage Vbr of the Zener diode ZD, so that the gate of the switching element SW3 is charged via the Zener diode ZD. Therefore, the switching element SW3 is turned on regardless of the turn-off operation by the CPU 62. Consequently, the decrease rate of the current I flowing through the coil 24 is controlled by the breakdown voltage Vbr. Then, the CPU 62 stands by until a damping acceleration time TD elapses (S54: NO).

When the damping acceleration time TD has elapsed (S54: YES), the CPU 62 determines whether or not the partial lift injection processing is performed for learning, in other words, whether or not it is during learning (S56). When the CPU 62 has determined that it is during learning (S56: YES), the CPU 62 turns on the switching element SW3 (S58). Consequently, the decrease rate of the current I flowing through the coil 24 corresponds to the magnitude (absolute value) of voltage drop across the shunt resistor R. As shown in FIG. 7, the voltage Vc of the coil 24 is negative after time t3 at which the switching element SW3 is turned off. This is because the induced electromotive force in the coil 24 causes the second terminal T2 side to be positive.

Referring back to FIG. 6, the CPU 62 monitors an occurrence of an inflection point in the change rate of voltage drop across the shunt resistor R (the change rate of absolute value of the electric potential V) (S60). This processing is for detecting a closing timing of the fuel injection valve 20. That is, while the movable element 25 is displaced in the valve closing direction before the fuel injection valve 20 is closed, the displacement speed of the movable element 25 is rapidly reduced when the fuel injection valve 20 is closed. Therefore, the relative speed of the movable element 25 with respect to the coil 24 is rapidly reduced by the closing of the fuel injection valve 20, so that there occurs a change in the induced electromotive force. This change in the induced electromotive force appears as an inflection point in the change of the electric potential V. FIG. 7 shows that, by the occurrence of an inflection point at time t4, an inflection point is detected in the change rate of the electric potential V (the change rate of the current I). For example, the inflection point detection processing may be such that the timing at which a value obtained by subtracting, from a first filter value obtained by filtering the electric potential V by a first low-pass filter, a second filter value obtained by filtering the electric potential V by a second low-pass filter having a cutoff frequency lower than that of the first low-pass filter reaches a threshold value is determined to be a detection timing of an inflection point.

When the inflection point is detected (S60: YES), the CPU 62 stores the detection timing of the inflection point in the nonvolatile memory 66 and then turns off the switching element SW3 after the current I is sufficiently damped (S62). When the processing of S62 has been completed or when a negative determination has been made at S56, the CPU 62 once ends the series of processing shown in FIG. 6.

The CPU 62 calculates the correction amount QL based on the detection timing of the inflection point at S60. That is, the CPU 62 sets a reference valve closing timing according to the energization time TQp calculated at S44, while the CPU 62 sets the correction amount QL to a negative value provided that the detection timing is later than the reference valve closing timing, and sets the correction amount QL to a positive value provided that the detection timing is earlier than the reference valve closing timing. Consequently, in the processing of S42, the CPU 62 corrects the partial lift injection amount Qp* so as to be smaller when the detection timing is later than when it is earlier, and thus the energization time TQp is corrected so as to be shorter. In other words, the energization time of the coil 24 is corrected so as to be shorter when the detection timing is later than when it is earlier.

Herein, the operation of this embodiment will be described. When performing the rapid warm-up operation, the CPU 62 performs the partial lift injection processing after the full lift injection processing, but does not perform the learning processing of the injection characteristics about the partial lift injection processing. On the other hand, when the learning execution conditions are established, the CPU 62 first performs the partial lift injection processing and then performs the full lift injection processing. Consequently, it is possible to prevent a situation in which the detection timing of the inflection point is affected due to residual magnetic flux caused by energization processing to the coil 24 by the full lift injection processing so that the detection accuracy of the valve closing timing is lowered.

Further, when the learning execution conditions are established, the CPU 62 performs the partial lift injection processing and the full lift injection processing in the intake stroke within the predetermined period (the period which is the sum of the prescribed period and a period from the end of the energization processing of the full lift injection to the valve closing). Consequently, it is possible not only to avoid overlapping of the partial lift injection with the execution period of the full lift injection processing or the like in the other cylinder, but also to temporally separate the partial lift injection from such an execution period in the other cylinder. Therefore, it is possible to prevent that noise caused by the start or stop of energization of the coil 24 in the other cylinder is superimposed on an electrical path or the like connected to the coil 24 being the inflection point detection object so that the accuracy of the detection timing of the inflection point is lowered. The electrical path on which the noise is superimposed is, specifically, a wire or the like between the second terminal T2 of the coil 24 of each cylinder and the electronic control unit 50. That is, among those wires, noise from the wire of the cylinder in which the full lift injection is performed may be superimposed on the wire of the cylinder in which the partial lift injection is performed.

According to this embodiment described above, the following effects can be further obtained. The injection start timing by the partial lift injection processing is set on the more advanced side when the rotational speed NE is high than when it is low. Since the speed at which the piston 14 moves away from the fuel injection valve 20 becomes higher when the rotational speed NE is high than when it is low, even if the injection start timing is set on the more advanced side, it is possible to suppress the occurrence of a situation in which injected fuel adheres to the piston 14. On the other hand, when fuel is injected after the piston 14 is moved sufficiently away from the fuel injection valve 20, the possibility is increased that the injected fuel adheres to a wall surface of the cylinder 12. Therefore, by setting the injection start timing on the more advanced side when the rotational speed NE is high than when it is low, adhesion of the injected fuel to the piston 14 or the wall surface of the cylinder 12 can be suppressed to the utmost.

In the rapid warm-up operation, the partial lift injection processing is performed after the full lift injection processing and in the compression stroke. Consequently, the execution period of the partial lift injection processing can be set close to the ignition timing, so that it is easy to cause fuel injected by the partial lift injection processing to suitably float around the plug of the ignition device 30 at the ignition timing.

The partial lift learning injection amount Qp1L is set to be greater when the pressure PF is high than when it is low. Consequently, regardless of the magnitude of the pressure PF, it is possible to perform energization processing that is appropriate for learning.

In the description of the above embodiment, the processing of S60 is one example of valve closing detection processing. Using a terminal potential of a coil in the valve closing detection processing corresponds to detection of an inflection point based on the electric potential V, and since the electric potential V is in one-to-one correspondence with a current that flows through the coil 24 by a resistance value of the shunt resistor R, it also corresponds to detection of an inflection point based on the current that flows through the coil 24. The processing of S42 is one example of correction processing. The processing of S20 and S22 is one example of injection amount division processing, while the processing of S30 is one example of time division processing. The processing of S24 is one example of advance processing. The processing of the target value setting processing unit M10 is one example of variable setting processing. The processing of the deviation calculation processing unit M12 and the pump operation processing unit M16 is one example of fuel pressure control processing. The processing of S12, S14, and S16 is one example of injection amount variable processing. The high-pressure fuel pump 40 is one example of a fuel pump.

Other Embodiments

At least one of the matters of the above embodiment may be changed as follows. "About Predetermined Period in Intake Stroke" In the above embodiment, the start point of the predetermined period is variably set based on the rotational speed NE and the load, but not limited thereto. For example, it may be variably set based on only the rotational speed NE. Alternatively, for example, the start point of the predetermined period may be a fixed crank angle.

In the above embodiment, the end point of the predetermined period is variably set based on the rotational speed NE and the load, but not limited thereto. For example, it may be variably set based on only the rotational speed NE. Alternatively, for example, the end point of the predetermined period may be a fixed crank angle.

"About Injection Period" In the above embodiment, when learning the injection characteristics of the fuel injection valve 20, the partial lift injection and the full lift injection are performed within the predetermined period in the intake stroke, but not limited thereto. For example, partial lift injection and full lift injection may be performed within a predetermined period in the compression stroke, or may be performed within a predetermined period spanning the intake stroke and the compression stroke and not overlapping with a predetermined period of any of the other cylinders.

"About Correction Processing" In the above embodiment, it is not specified how many detection timings should be used for calculating the correction amount. For example, the correction amount may be calculated based on the single detection timing or may be calculated based on the exponential moving average value of time series data of detection timings.

In the above embodiment, the partial lift injection amount $Qp^*$ is corrected based on the detection timing, but not limited thereto. For example, the energization time TQp may be corrected, or the peak command value $Ipeak^*$ may be corrected.

In the above embodiment, the reference value of detection timing is determined according to the partial lift injection amount $Qp^*$, but not limited thereto. For example, the reference value of detection timing may be the mean value of detection timings of all the cylinders. In this case, the injection amount command value or the energization time may be corrected so as to reduce differences between valve closing timings of all the cylinders. In this case, the absolute value of a fuel amount that is injected from the fuel injection valve 20 is not always corrected to a proper value, but by further correcting the injection amount command value or the energization time of partial lift injection based on an operation amount of air-fuel ratio feedback control, the absolute value of an injection amount can be made to approach the proper value. In this case, prior to the learning processing, learning processing by full lift injection is completed in advance.

Figure 8:
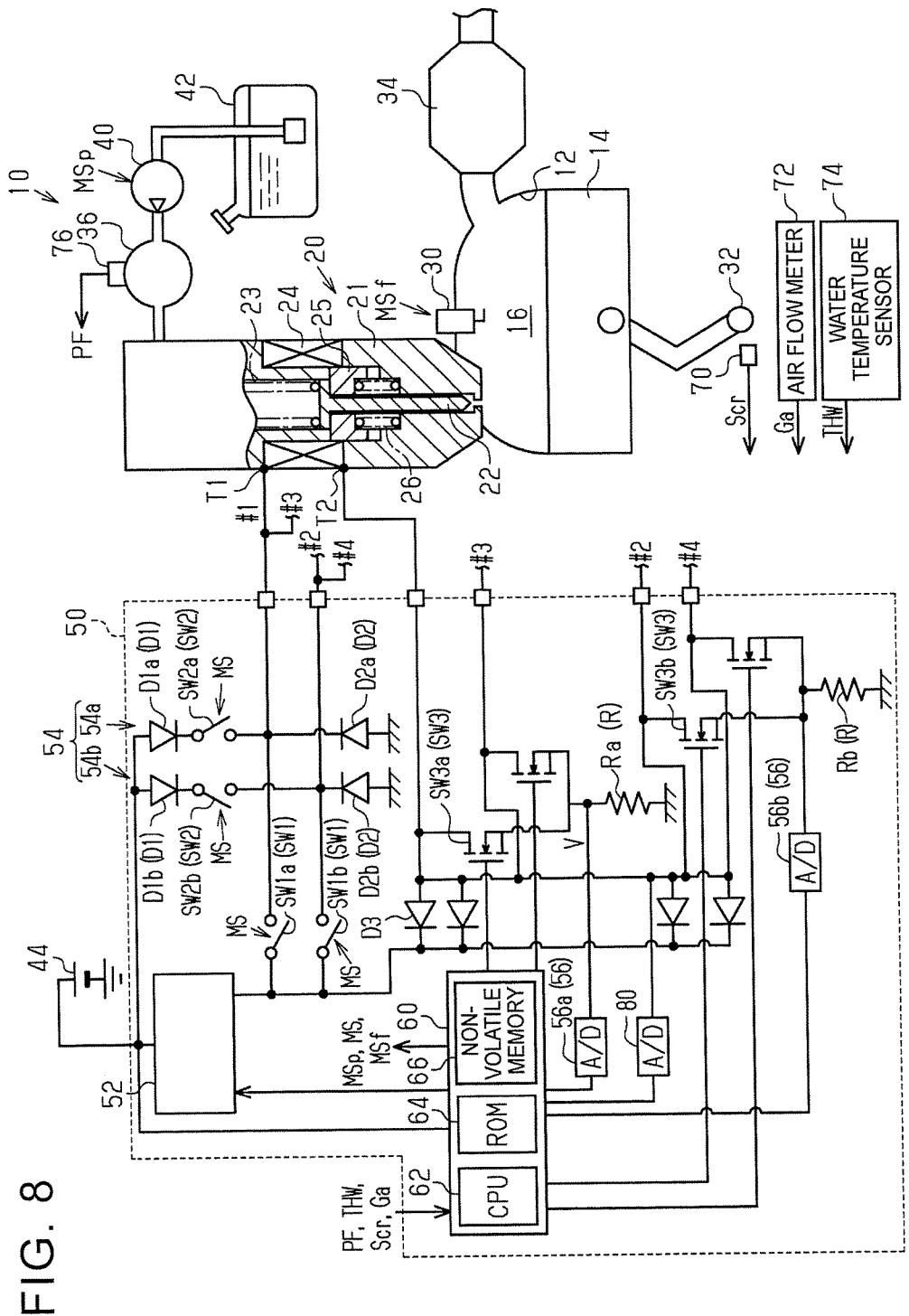
FIG. 8 is a diagram showing a fuel injection control device and an internal combustion engine according to a modification of the embodiment.

"About Noise by Partial Lift Injection during Normal Time" In the above embodiment, the partial lift injection processing for learning is performed in order to avoid that, for example, among the wires between the second terminals T2 of the coils 24 of the cylinders and the electronic control unit 50, noise from the wire of the cylinder in which the full lift injection is performed is superimposed on the wire of the cylinder in which the partial lift injection is performed, but not limited thereto. For example, as shown in FIG. 8, second terminals T2 of coils 24 of cylinders are connected to each other and the electric potential of the connected second terminals T2 is detected by a CPU 62 via an A/D converter 80, wherein partial lift injection may be performed in order to avoid noise due to such detection by the CPU 62. The second terminals T2 of the coils 24 of the cylinders are connected to the output terminal side of a booster circuit 52 via diodes D3, so that the energy of the coils 24 is recovered to the booster circuit 52 by the processing of S52 in FIG. 6. The period of this energy recovery is determined by the processing of S54 in FIG. 6. Thereafter, the CPU 62 turns on a switching element SW3 (S58) and detects an inflection point based on a value of electric potential input to the A/D converter 80.

The configuration in which the wires each for detecting an inflection point in the temporal change of the induced electromotive force in the coil 24 of the corresponding cylinder are in continuity with each other is not limited to that shown in FIG. 8. Further, in FIG. 8, a selector may be provided between anodes of the diodes D3 corresponding to the respective cylinders and the A/D converter 80. Even in this case, in order to avoid that when partial lift injection is performed in one cylinder, electrical noise due to full lift injection in another cylinder affects the input of the A/D converter 80 via the selector, it is effective to perform partial lift injection processing for learning.

"About Method of Detecting Valve Closing of Fuel Injection Valve 20" For example, as described in the column of "About Noise by Partial Lift Injection during Normal Time", in the configuration of FIG. 8, the electric potential of the second terminal T2 of the coil 24 may be detected via the A/D converter 80, and based on this, an inflection point in the temporal change of the induced electromotive force in the coil 24 due to a decrease in the relative speed of a movable element 25 with respect to the coil 24 may be detected. In this case, compared to using an A/D converter 56, the electric potential of the second terminal T2 can be detected without the influence of a voltage drop across the switching element SW3.

The detection method of an inflection point in the temporal change of the induced electromotive force in the coil 24 due to a decrease in the relative speed of the movable element 25 with respect to the coil 24 following the stop of energization processing to the coil 24 is not limited to that described in the above embodiment. For example, use may be made of a circuit in which an anode of a detection diode is connected to the second terminal T2 of the coil 24, a cathode of the detection diode is connected to one of terminals of a capacitor, and the other terminal of the capacitor is grounded. That is, in this case, following the stop of the energization processing, while a current flows through a loop path formed by the diode D2, the coil 24, the detection diode, and the capacitor, the current through the coil 24 decreases. Consequently, the movable element 25 is displaced in the valve closing direction, and an inflection point in the temporal change of the induced electromotive force in the coil 24 due to a decrease in the relative speed of the movable element 25 with respect to the coil 24 can be detected based on a voltage of the capacitor. After the fuel injection valve 20 is closed, the capacitor is discharged until the next energization processing to the coil 24.

The detection method of an inflection point in the temporal change of the induced electromotive force in the coil 24 due to a decrease in the relative speed of the movable element 25 with respect to the coil 24 is not limited to a detection method that is based on detection of an electric potential on the second terminal T2 side of the coil 24. A detection method that is based on detection of an electric potential on the first terminal T1 side of the coil 24 can be realized using, for example, the following circuit. That is, following the stop of the energization processing, the circuit connects the second terminal T2 to a positive electrode of the battery 44 and grounds the first terminal T1 via a resistor. With this configuration, an inflection point in the temporal change of the induced electromotive force in the coil 24 due to a decrease in the relative speed of the movable element 25 with respect to the coil 24 can be detected by an inflection point in the change of electric potential on the first terminal T1 side.

Not limited to detection of an inflection point in the temporal change of the induced electromotive force using a member electrically connected to the first terminal T1 side or the second terminal T2 side, use may be made of, for example, a current transformer that detects a current flowing through the coil 24 without contacting the coil 24 or the like. In this case, an inflection point in the temporal change of the induced electromotive force may be detected based on a change in the waveform of the current.

In the above embodiment, the timing at which a value obtained by subtracting a second filter value from a first filter value reaches the threshold value is determined to be a detection timing of an inflection point, but not limited thereto. For example, the timing at which a second-order differential value of electric potential becomes maximum may be detected as a detection timing of an inflection point.

The method of detecting valve closing of the fuel injection valve 20 based on the terminal potential of the coil 24 or the current flowing through the coil 24 is well known as described in, for example, Published Japanese Translation of PCT Application No. 2012-524210 (JP-A-2012-524210) and US 2011/0251808 A. The valve closing detection processing may be an arbitrary method that detects valve closing of the fuel injection valve 20 by detecting characteristic behavior, at the time of valve closing, of the terminal potential of the coil 24 or the current flowing through the coil 24 based on a detection value of the terminal potential or a detection value of the current.

With respect to the injection amount of partial lift injection during learning, the coefficient α in the processing of S16 is not limited to the value about "½" and may be adjusted as appropriate in a range equal to or more than "0" and equal to or less than "1".

The partial lift learning injection amount Qp1L is not limited to an amount that is calculated by the processing of S16. For example, when the possible range of the target value PF* is narrow or the like, the partial lift learning injection amount Qp1L may be set to a fixed value.

Instead of the processing of S28 in FIG. 4, as the learning execution condition, it may be determined whether or not the rotational speed NE is equal to or less than a predetermined speed. In other words, one of the learning execution conditions may be a condition that the rotational speed NE is equal to or less than the predetermined speed. Herein, the predetermined speed is a speed such that the end timing of the full lift injection processing falls within the predetermined period in the intake stroke.

In the configuration described above, during rapid warm-up operation, the partial lift injection processing is performed once after the full lift injection processing, but not limited thereto. The partial lift injection processing may be performed, for example, twice after the full lift injection processing.

In the above embodiment, the partial lift injection processing is performed for rapid warm-up, but not limited thereto. For example, partial lift injection may be performed for cold start operation. Alternatively, for example, partial lift injection may be performed by executing lean combustion control in low-load operation or middle-load operation after the start-up. Even in this case, in order to allow atomized fuel to float around the plug of the ignition device 30 at the ignition timing, partial lift injection may be performed after full lift injection at a timing close to the ignition timing.

As partial lift injection for learning, partial lift injection is not necessarily performed in all the cylinders in one combustion cycle. For example, during a fuel-cut operation, partial lift injection may be performed once in only one cylinder in a rotation period corresponding to one combustion cycle, and learning of the injection characteristics may be performed based on this.

The fuel pressure control processing is not limited to processing that operates the high-pressure fuel pump 40 in order to feedback-control the pressure PF to the target value PF*. For example, it may be processing that operates the high-pressure fuel pump 40 only by open-loop control based on the required injection amount Q*.

The electronic control unit is not limited to one that includes the CPU 62 and the ROM 64 and executes the software processing. For example, the electronic control unit may include a dedicated hardware circuit (e.g. ASIC) for hardware-processing at least part of the functions created by the software processing in the above embodiment. That is, the fuel injection control device may have any of the following configurations (a) to (c). (a) The fuel injection control device includes a processing device that executes all the processing described above according to programs, and a program storage device such as a ROM that stores the programs. (b) The fuel injection control device includes a processing device that executes part of the processing described above according to programs, a program storage device, and a dedicated hardware circuit for executing the remaining processing. (c) The fuel injection control device includes a dedicated hardware circuit for executing all the processing described above. Herein, there may be provided a plurality of software processing circuits each including a processing device and a program storage device, and a plurality of dedicated hardware circuits. That is, the processing described above may be executed by a processing circuit including at least either of one or the plurality of software processing circuits and one or the plurality of dedicated hardware circuits.

The internal combustion engine is not limited to one that includes only the in-cylinder injection fuel injection valves 20, and may be, for example, one that further includes port injection valves.

The internal combustion engine is not limited to a four-cylinder internal combustion engine and may be, for example, a six-cylinder or eight-cylinder internal combustion engine. Even in this case, by preventing injection periods in cylinders from overlapping with each other during learning, the learning accuracy of the injection characteristics can be maintained high.

A fuel injection valve being an injection characteristic learning object is not limited to an in-cylinder injection valve and may alternatively be a port injection valve.

What is claimed is:

1. A fuel injection control device for an internal combustion engine having a plurality of cylinders,
   the internal combustion engine including fuel injection valves respectively for the plurality of cylinders,
   the fuel injection valve including a movable element made of a magnetic body and a nozzle needle and configured to open when an electromagnetic force generated by energization processing to a coil acts on the movable element,
   the fuel injection control device comprising:
   an electronic control unit configured to execute partial lift injection processing that opens the fuel injection valve by the energization processing in such a way that the nozzle needle does not reach a maximum lift amount,
   the electronic control unit configured to, when having determined that it is during learning of an injection characteristic of the fuel injection valve, execute valve closing detection processing that detects valve closing of the fuel injection valve based on at least one of a terminal potential of the coil and a current flowing through the coil, the valve closing of the fuel injection valve caused by ending the partial lift injection processing,
   the electronic control unit configured to, when executing the valve closing detection processing for one of the plurality of cylinders, set a fuel injection period of the corresponding partial lift injection processing such that the corresponding partial lift injection processing is performed in the fuel injection period which does not overlap with a fuel injection period by the fuel injection valve of any of the other cylinders,
   the electronic control unit configured to, based on a detection timing of the valve closing of the fuel injection valve by the valve closing detection processing, execute correction processing that corrects the energization processing for execution of the partial lift injection processing,
   the electronic control unit configured to execute injection amount division processing that divides a required injection amount for the fuel injection valve into an injection amount for the partial lift injection processing and an injection amount for full lift injection processing that opens the fuel injection valve to the maximum lift amount,
   the electronic control unit configured to, when having determined that a learning condition for the injection characteristic of the fuel injection valve is established, execute time division processing that operates the fuel injection valve so as to execute the full lift injection processing after executing the partial lift injection processing based on the injection amount division processing, and
   the electronic control unit configured to, when executing the valve closing detection processing, set a fuel injection period of the partial lift injection processing and a fuel injection period of the full lift injection processing so as not to overlap with each other in the plurality of cylinders.

2. The fuel injection control device for an internal combustion engine according to claim 1, wherein
   the electronic control unit is configured to execute the correction processing that corrects the energization processing for execution of the partial lift injection processing based on an inflection point in a temporal change of an induced electromagnetic force in the coil following an end of the partial lift injection processing.

3. The fuel injection control device for an internal combustion engine according to claim 1, wherein
   the fuel injection valve is configured to inject fuel into a combustion chamber, and
   the electronic control unit is configured to, when executing the valve closing detection processing, set the fuel injection period of the partial lift injection processing and the fuel injection period of the full lift injection processing within a predetermined period in an intake stroke.

4. The fuel injection control device for an internal combustion engine according to claim 3, wherein
   the electronic control unit is configured to execute advance processing that sets an injection start timing of the partial lift injection processing, according to establishment of the learning condition, on a more advanced side when a rotational speed of a crankshaft of the internal combustion engine is high than when the rotational speed is low.

5. The fuel injection control device for an internal combustion engine according to claim 1, wherein
   the fuel injection valve is configured to inject fuel into a combustion chamber, and the electronic control unit is configured to, when having determined that the learning condition for the injection characteristic of the fuel injection valve is not established, execute the partial lift injection processing after executing the full lift injection processing.

6. The fuel injection control device for an internal combustion engine according to claim 5, wherein
the electronic control unit is configured to, when having determined that the learning condition for the injection characteristic of the fuel injection valve is not established, execute the partial lift injection processing in a compression stroke.

7. The fuel injection control device for an internal combustion engine according to claim 1, wherein
the internal combustion engine further includes a fuel tank storing fuel to be injected by the fuel injection valve and a fuel pump configured to discharge the fuel in the fuel tank to the fuel injection valve side,
the electronic control unit is configured to execute variable setting processing that variably sets a target value of a pressure of the fuel to be supplied to the fuel injection valve,
the electronic control unit is configured to control the fuel pump so as to execute fuel pressure control processing that controls the pressure of the fuel to be supplied to the fuel injection valve to the target value set by the variable setting processing, and
the electronic control unit is configured to execute injection amount variable processing that increases an injection amount of the partial lift injection processing, according to establishment of the learning condition, when the pressure of the fuel to be supplied to the fuel injection valve is high compared to when the pressure is low.

8. A fuel injection control method for an internal combustion engine having a plurality of cylinders,
the internal combustion engine including fuel injection valves respectively for the plurality of cylinders and configured to be controlled by an electronic control unit, the fuel injection valve including a movable element made of a magnetic body and a nozzle needle and configured to open when an electromagnetic force generated by energization processing to a coil acts on the movable element,
the fuel injection control method comprising:
executing, by the electronic control unit, partial lift injection processing that opens the fuel injection valve by the energization processing in such a way that the nozzle needle does not reach a maximum lift amount;
executing, by the electronic control unit, when the electronic control unit has determined that it is during learning of an injection characteristic of the fuel injection valve, valve closing detection processing that detects valve closing of the fuel injection valve based on at least one of a terminal potential of the coil and a current flowing through the coil, the valve closing of the fuel injection valve caused by ending the partial lift injection processing;
setting, by the electronic control unit, when executing the valve closing detection processing for one of the plurality of cylinders, a fuel injection period of the corresponding partial lift injection processing such that the corresponding partial lift injection processing is performed in the fuel injection period which does not overlap with a fuel injection period by the fuel injection valve of any of the other cylinders;
executing, by the electronic control unit, based on a detection timing of the valve closing of the fuel injection valve by the valve closing detection processing, correction processing that corrects the energization processing for execution of the partial lift injection processing;
executing, by the electronic control unit, injection amount division processing that divides a required injection amount for the fuel injection valve into an injection amount for the partial lift injection processing and an injection amount for full lift injection processing that opens the fuel injection valve to the maximum lift amount,
executing, by the electronic control unit, when the electronic control unit has determined that a learning condition for the injection characteristic of the fuel injection valve is established, time division processing that operates the fuel injection valve so as to execute the full lift injection processing after executing the partial lift injection processing based on the injection amount division processing, and
setting, by the electronic control unit, when the electronic control unit executes the valve closing detection processing, a fuel injection period of the partial lift injection processing and a fuel injection period of the full lift injection processing so as not to overlap with each other in the plurality of cylinders.

9. The fuel injection control method for an internal combustion engine according to claim 8, wherein
the executing, by the electronic control unit, of the correction processing that corrects the energization processing for execution of the partial lift injection processing is based on an inflection point in a temporal change of an induced electromagnetic force in the coil following an end of the partial lift injection processing.

* * * * *